United States Patent [19]

Musto et al.

[11] 4,201,476

[45] May 6, 1980

[54] LASER DIMENSION GAUGE

[75] Inventors: Dominick J. Musto, Middlesex; Harold Lerner, Ft. Lee, both of N.J.

[73] Assignee: The Austin Company, Cleveland, Ohio

[21] Appl. No.: 867,290

[22] Filed: Jan. 5, 1978

[51] Int. Cl.² .............................................. G01B 11/04
[52] U.S. Cl. .................................................... 356/386
[58] Field of Search ............... 356/160, 167, 386, 387; 350/6.5, 6.6, 6.7, 6.8, 6.9

[56] References Cited

U.S. PATENT DOCUMENTS

| | | | |
|---|---|---|---|
| 3,470,383 | 9/1969 | Persson et al. | 356/160 |
| 3,544,165 | 12/1970 | Snedden | 350/6.5 |
| 3,744,915 | 7/1973 | Sick | 356/160 |
| 3,765,774 | 10/1973 | Petrohilos | 356/387 |
| 3,776,640 | 12/1973 | Ikegami | 356/387 |
| 3,856,412 | 12/1974 | Zanoni | 356/386 |
| 3,870,890 | 3/1975 | Binks et al. | 356/160 |
| 3,874,798 | 4/1975 | Antonsson et al. | 356/386 |
| 3,905,705 | 9/1975 | Petrohilos | 356/160 |
| 4,082,463 | 4/1978 | Dehait et al. | 356/167 |

Primary Examiner—John K. Corbin
Assistant Examiner—R. A. Rosenberger
Attorney, Agent, or Firm—Pearne, Gordon, Sessions, McCoy & Granger

[57] ABSTRACT

A laser gauge to measure a dimension of a workpiece is disclosed wherein a laser beam is directed through a beam splitter to a rotating mirror at the focal point of a parabolic mirror. This rotating mirror causes the laser beam to scan the parabolic mirror and establish a series of parallel laser beams emanating from the parabolic mirror and directed toward the workpiece which may be a hot forged bar or other such workpiece in a hostile environment. First and second laser beam paths lie immediately adjacent opposite sides of the workpiece and are reflected back to the parabolic mirror along the same beam paths by a retroreflective surface. The laser beams are reflected by the parabolic mirror and rotating mirror to the beam splitter whereby they are reflected to a photodetector. A microprocessor is programmed to determine the dimension of the workpiece in accordance with the positions of the rotating mirror which establish the first and second beam paths. The foregoing abstract is merely a resume of one general application, is not a complete discussion of all principles of operation or applications, and is not to be construed as a limitation on the scope of the claimed subject matter.

12 Claims, 6 Drawing Figures

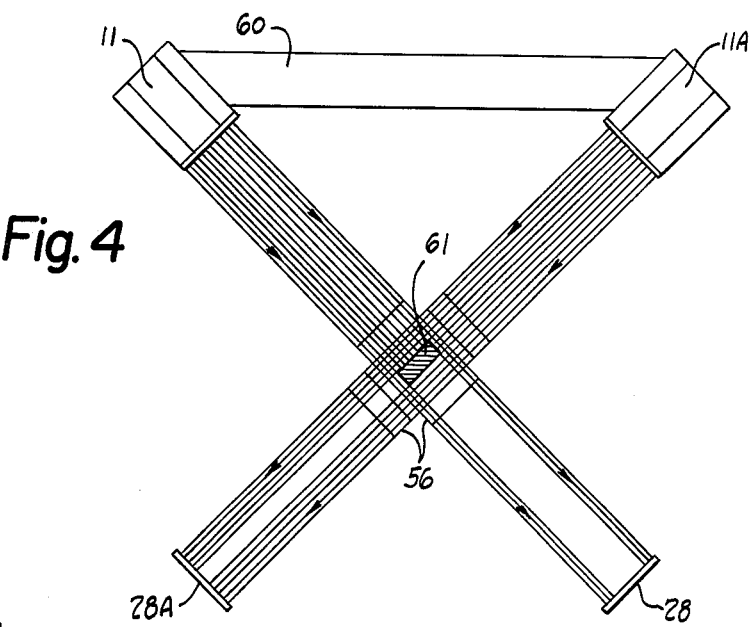
Fig. 4
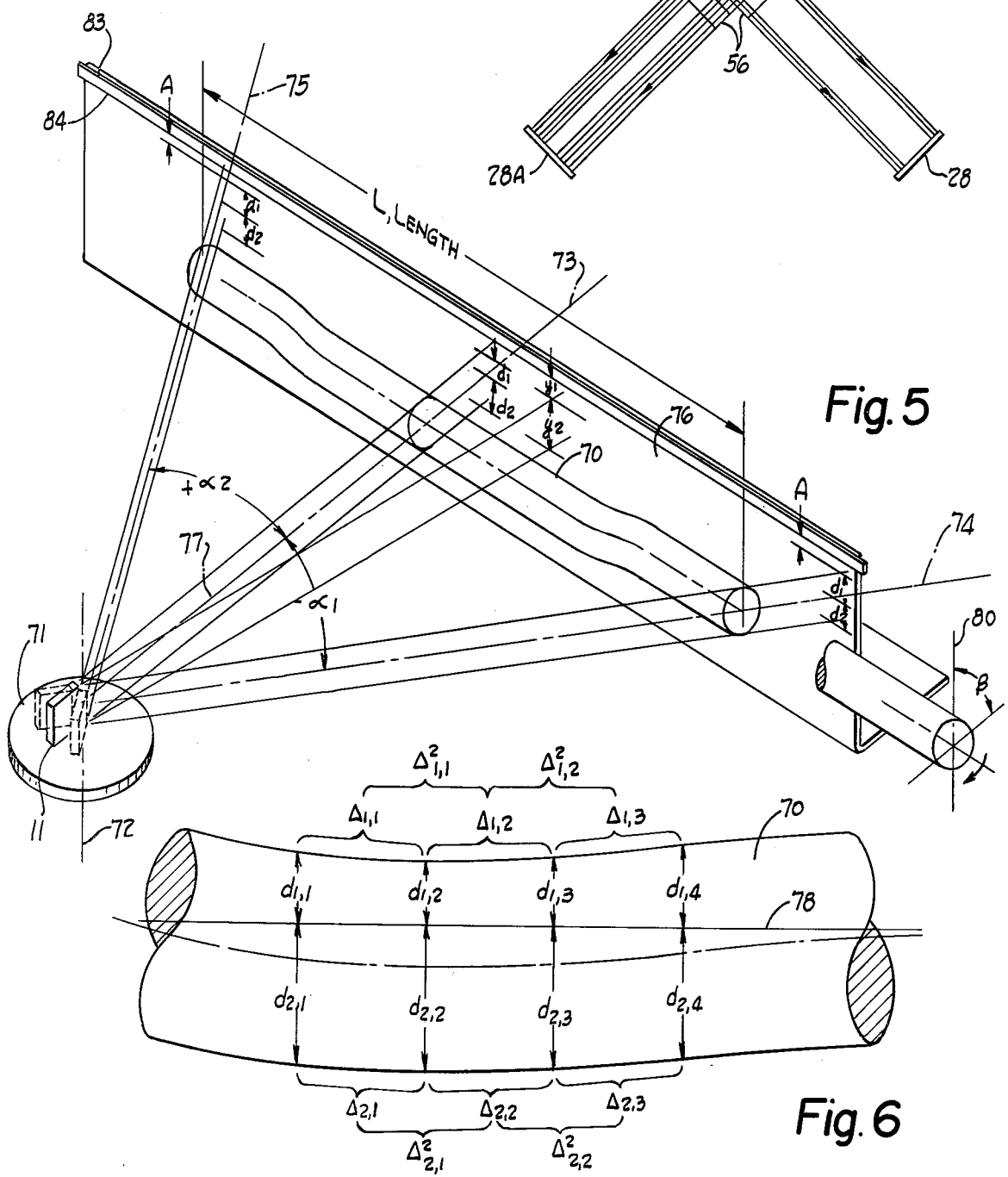
Fig. 5
Fig. 6

LASER DIMENSION GAUGE

BACKGROUND OF THE INVENTION

The prior art has known the use of a rotating flat mirror at the focal point of a parabolic mirror to scan a hot glowing object with the scan falling on a photocell. The time from scan of one side to the other of the object indicates its dimension.

Another prior art apparatus is one wherein a rotating mirror is provided at the focal point of a parabolic reflector. Part of the beam is reflected from a raster reflector and the larger part of the beam passes through the field of scan of an object and is then reflected from retroreflective material. Pulses are counted to determine the dimension of the object.

Another prior art apparatus utilizes a rotating mirror and lens to scan an image of an object onto a code plate having a striped pattern, the scan of which converts the covered or uncovered stripes into a corresponding number of pulses which are then counted to be an indication of the dimension of the object.

Another prior art apparatus utilizes a laser and a rotating mirror to a beam splitter and lenses to establish parallel laser beams to scan an object in two mutually perpendicular directions. A master clock creates pulses as the object is scanned while the photocell is dark, the time being determined by the number of pulses and this gives the diameter as the workpieces scan from one side to the other.

Another prior art apparatus scans hot bars, with the light beam from the two sides of the hot bar passing through a lens and then onto two separate diode arrays. The shaded parts of each array are then counted for two complementary portions of the dimension of the bar.

The difficulty with the prior art systems is that most are not usable in a hot, dirty or otherwise hostile environment because parts of the system must be located close to the workpiece, or parts of the system must be on opposite sides of the workpiece, or the dimension of the workpiece must be small to be smaller than a lens used in the system, or the system depends upon infrared radiation from the object hence it must be hot and glowing, or the system will not operate with sufficient accuracy, or will not measure a vibrating or rapidly moving object, or they scan from one side of the object to the other without any reference beam.

SUMMARY OF THE INVENTION

The above-mentioned disadvantages may be overcome and the problem solved by a laser gauge for non-contact measuring of a dimension of a workpiece comprising, in combination, a laser mounted to project a laser beam, a parabolic mirror having a focal point along the axis of the mirror, scannable means substantially at said focal point mounted to scan said laser beam along said parabolic mirror and establishing first and second laser beam paths extending from said parabolic mirror parallel to said axis and immediately adjacent first and second opposite sides of the workpiece, respectively, photodetector means mounted to receive the laser light beam for both said first and second laser beam paths, output means connected to receive the output of said photodetector means, means actuated in accordance with said scannable means to determine the position thereof and having an output to said output means, whereby a first signal is received at said output means when said scannable means is positioned at a first position to establish the laser beam in said first beam path, and a second signal is received at said output means when said scannable means is positioned at a second position to establish the laser beam in said second path, and said output means including means to determine the dimension perpendicular to said axis of any said workpiece in accordance with said first and second positions.

Accordingly, an object of the invention is to provide a laser gauge suitable for remote measurement of a dimension of a workpiece in a hot, dirty or otherwise hostile envirnment.

Another object of the invention is to provide a laser gauge to measure a dimension of a workpiece wherein the gauge optics and circuit components may all be on one side of the workpiece remote therefrom so as to be non-interfering with the simultaneous processing of the workpiece.

Another object of the invention is to provide a laser gauge with a reference beam such that the dimension of the workpiece is measured in two partial dimensions which are summed.

Another object of the invention is to provide a laser workpiece gauge utilizing an aperture in a parabolic mirror to establish a reference beam to obtain two partial dimensions of the workpiece.

Another object of the invention is to provide a laser gauge which will measure eccentricity or ovality of a workpiece or will measure a vibrating or otherwise rapidly moving workpiece.

Another object of the invention is to provide a laser gauge to determine the length of an object.

Another object of the invention is to provide a laser gauge to determine the lengthwise straightness of an object.

Other objects and a fuller understanding of the invention may be had by referring to the following description and claims, taken in conjunction with the accompanying drawing.

BRIEF DESCRIPTION OF THE DRAWING

FIG. 4 is an elevational view of two laser gauges measuring perpendicular dimensions of a workpiece;

FIG. 5 is an isometric view of a laser gauge system to measure the straightness of a workpiece; and FIG. 6 is a diagrammatic view of a lengthwise curved workpiece, such as in FIG. 5.

DESCRIPTION OF THE PREFERRED EMBODIMENTS

Figure 1:
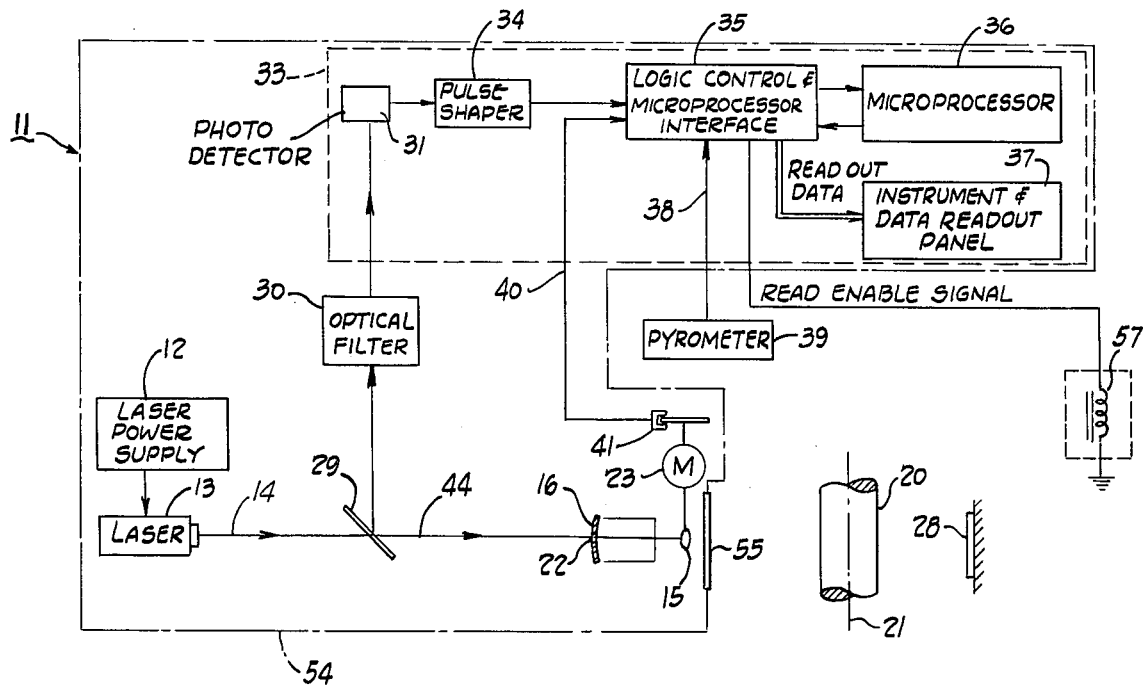
FIG. 1 is a plan view of a laser gauge embodying the invention and incorporating a block circuit diagram.
Figure 2:
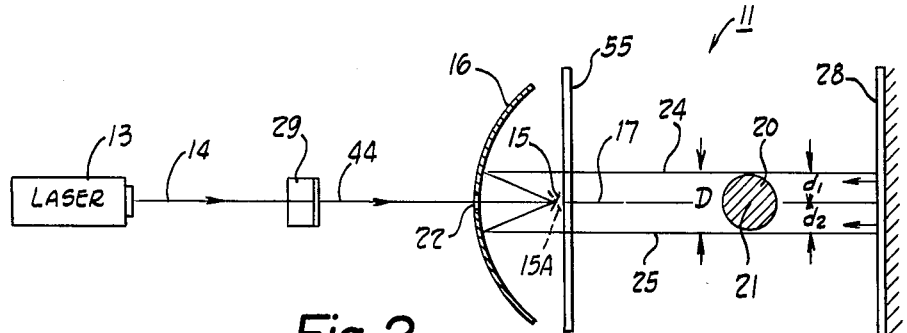
FIG. 2 is an elevational view of the laser gauge of FIG. 1.

FIGS. 1 and 2 show a laser guide 11 wherein a power supply 12 supplies electrical power to a laser 13 which may be of many different types but one satisfactory type is a helium-neon laser emitting a laser beam 14. This laser beam 14 is scanned by scannable means 15 onto a parabolic reflector 16. The scannable means is provided so that laser beam scans along the reflective surface of the parabolic reflector 16 so that parallel rays are emitted from this parabolic reflector parallel to the axis 17 of this reflector. These parallel rays are directed toward a workpiece 20 so that the laser gauge 11 may determine the dimension of this workpiece which is perpendicular to the axis 17. Preferably the reflector axis 17 intersects the axis 21 of the workpiece 20, but as shown below this is not mandatory.

The scannable means 15 is positioned at the focal point of the parabolic reflector 16 so as to sweep or scan the surface of the parabolic reflector 16. The laser 13 is positioned so that laser beam 14 impinges on the scannable means 15. In so doing, the preferred mounting is that the laser beam 14 is in the plane of the paper of FIG. 1, and as shown in both FIGS. 1 and 2, the preferred construction is one wherein the laser beam 14 is coincident with the reflector axis 17. In order to have this laser beam 14 coincident with axis 17, the laser beam 14 passes through a small aperture 22 in the parabolic reflector 16. This aperture 22 is along this axis 17. The scannable means 15 is pivotable so that it is capable of being pivoted to various angles so that the laser beam 14 reflected from the mirrow will sweep the entire front surface of the parabolic reflector 16. In the preferred embodiment the scannable means is a rotatable front surface mirror rotated by a motor 23. The parabolic reflector 16 may be a plane parabolic reflector but in the preferred embodiment is a thin slice of a paraboloid of revolution in order to maintain the laser beam 14 with a minimum of angular beam spread.

The rotatable mirror 15 causes the laser beam to scan the parabolic reflector 16 from which a number of parallel rays are emitted. These scan the workpiece 20 establishing first and second laser beam paths 24 and 25. The first laser beam path 24 is one which extends from the parabolic mirror 16 and is immediately adjacent a first side of the workpiece 20 to strike and be reflected by a retroreflective tape 28. This may be a commercially available flexible tape on which a multitude of very tiny partially silvered glass beads are adhered. The property of this retroreflective tape is such that it does not obey the normal laws of reflection wherein the angle of incidence equals the angle of reflection, instead the laser light is reflected immediately back along the first laser beam path 24. The rotatable mirror 15 will be at a first angular position to establish this first laser beam path 24. The motor 23 rotates the motor at some suitable speed, e.g. three revolutions per second and due to the speed of light the mirror 15 appears to be standing still so that the light reflected from the retroreflective tape 28 will be reflected by the mirror 15, through the aperture 22 to a beam splitter 29.

When the rotatable mirror 15 is in the dotted line position 15A, this will be a second position thereof to establish the second laser beam path 25 which is immediately adjacent the opposite side of the workpiece 20. Again the laser light will be reflected by the retroreflective tape 28, by the parabolic mirror 16, by the rotatable mirror 15 in the second position 15A thereof to the beam splitter 29. This beam splitter may be of any suitable type, for example a partially silvered mirror to reflect part of the light through an optical filter 30. This optical filter will be one which is practically transparent to the color of the laser light yet is relatively opaque to the ambient illumination. In many industrial applications the ambient illumination is from fluorescent or mercury art lights which have light predominantly in the blue and green portions of the visible spectrum. With the helium-neon laser having a coherent light confined to the wave length of 632.8 nanometers, this red light is readily passed by the optical filter 30 to a photodetector 31 in an electrical circuit 33. From the photodetector 31 an electrical signal in accordance with the received laser light is passed to a pulse shaper 34 to form a square wave pulse from the signal of the detector 31. The signal is then fed to a logic control and microprocessor interface circuit 35 and a microprocessor 36. The circuit 33 includes an instrument and data readout panel 37 and may also include an input 38 from a pyrometer 39. The logic control circuit 35 also has an input 40 from a rate sensor 41. The rate sensor 41 is a means which is connected to the scannable means 15 and actuated in accordance therewith to determine the position of this scannable means, especially at the first and second positions thereof which establish the first and second laser beam paths 24 and 25. The electrical circuit 33 is an output means which determines the dimension of the workpiece 20 which is perpendicular to the axis 17.

Figure 3:
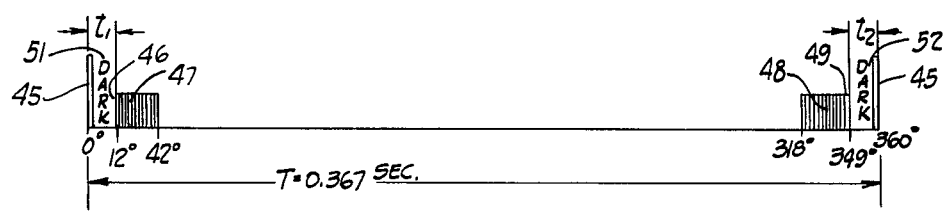
FIG. 3 is a graph of output signal versus angle of the mirror.

A feature of the invention includes means establishing a reference line that reference means 44 is provided relative to the first and second beam paths 24 and 25 for determining first and second partial dimensions of the workpiece 20. These two partial dimensions, when algebraically combined, give the total dimension of the workpiece 20 which is perpendicular to the parabolic reflector axis 17. In the preferred embodiment this reference means 44 is a reference beam which is reflected by the rotatable mirror 15 when it is in a reference position. As shown, this reference position is when the rotatable mirror 15 is perpendicular to the parabolic reflector axis 17 so that the laser beam 14 is reflected back along the path of this laser beam 14 and is partially reflected by the beam splitter 29. When received at the photodetector 31 this provides a reference pulse 45, FIG. 3. As shown in this FIG. 3 the reference pulse 45 occurs at time zero corresponding to the 0 degree reference angle of the rotatable mirror 15 at this instant of time. For the first small change in angular position of the mirror 15, the laser light reflected from the mirror 15 and parabolic reflector 16 will strike the workpiece 20 so that none will be reflected to the photodetector 31. When the mirror 15 is in the first position shown in FIG. 2, then the first laser light beam path 24 will be established with this laser light just clearing the upper edge of the workpiece 20. The photodetector 31 then has a first pulse 46, FIG. 3, applied to it. The photodetector 31 then receives light continuously until the rotatable mirror 15 is moved past the position whereat the light reflected therefrom no longer strikes the parabolic reflector 16. This will be the light signals 47 as shown in FIG. 3. Merely as an example for a particular size of mirror 16 and workpiece 20, this has been shown in FIG. 3 to be a 12° angle for the first position and a 42° angle when the beam passes the end of the parabolic reflector 16. No more reflections are received by the photodetector 31 until the mirror 15 is at a position, such as 318°, where the laser light beam just strikes the lower edge of the parabolic reflector 16. From this time on until the mirror is in the second position 15A, a group of light signals 48 will be received by the photodetector 31. When the rotatable mirror 15 is in the second position 15A, to establish the second laser beam path 25, the last light signal 49 will be a second signal to the photodetector 31 indicating that the second laser beam path 25 has been established which just clears the lower edge of the workpiece 20. As an example, this has been shown in FIG. 3 as being at a 349° position of mirror 15. When the rotatable mirror 15 is perpendicular to the laser beam 14, then another reference pulse 45 will be emitted by the photodetector 31, to restart the entire cycle.

The time $t_1$ is indicated on FIG. 3 by the reference numeral 51 and the time $t_2$ is indicated on FIG. 3 by the reference numeral 52. The rate sensor 41 supplies information to the logic control circuit 35 to determine these times $t_1$ and $t_2$. This time is related to the angular position $\phi$ of the rotating mirror 15. Mathematical analysis relates the angular position of the rotatable mirror to the upper partial dimension $d_1$ as follows:

$$d_1 = 2a \tan \phi_1, \qquad (1)$$

where $d_1$ = the distance of the beam path 24 to the parabolic reflector axis 17, a = the focal length of the parabolic mirror 16, and $\phi_1$ = the angular position of the rotatable mirror 15. As the rotatable mirror 15 continues to scan in a clockwise direction as viewed in FIG. 2, it achieves the angular position 15A corresponding to the angular postion $\phi_2$ that corresponds to the lower partial dimension $d_2$. This distance can be computed by equation 2:

$$d_2 = 2a \tan \phi_2, \qquad (2)$$

where $d_2$ = the distance of the beam path 25 to the parabolic reflector axis 17.

The total transverse dimension of the workpiece is measured in two parts, first $d_1$ is measured, then $d_2$. The overall dimension is computed by algebraically combining $d_1$ and $d_2$; namely, an algebraic summation:
$$D = d_1 + d_2,$$

where D equals the transverse dimension of the workpiece 20. The FIG. 2 shows that $d_1$ and $d_2$ are unique distances. The transverse dimension of the workpiece 20 can be accurately measured regardless of how it is aligned with respect to the laser gauge 11. It is not necessary that the axis 17 of the parabolic reflector 16 be aligned to intersect the axis 21 of the workpiece 20. This feature provides an intrinsic advantage of the laser gauge 11 over other prior art devices.

The rate sensor 41 may be any of several commercially available units, for example, it may be apertures in a disc rotated by the motor 23 with the rate sensor 41 obtaining a digital pulse signal in accordance with the presence or absence of such apertures. This will obtain a pulse for a particular angular displacement of the disc. Because of the reference beam 44 the electronic logic control circuit 35 and microprocessor 36 have a reference point so that the time $t_1$, numeral 51 on FIG. 3, will accurately indicate the angular position of the mirror 15 at the time the first laser beam path 24 is established. By using the formula 1 above, the distance $d_1$ is accurately determinable. Also the time $t_2$, shown at 52 in FIG. 3, is accurately determinable between the time of the establishment of the second laser beam path 25 and the next reference beam pulse 45. This permits an accurate determination of the distance $d_2$. The summation of these two partial dimensions gives the total dimension D.

The application of electronics and a microprocessor 36 converts the optically parallel beam generation to an electronic signal that converts the angular position of the mirror to a distance measurement. The system is high speed in that rapid summations of $d_1$ and $d_2$ can be made and displayed on a numeric indicator 37 as the diameter D. The entire laser 13, optics and electrical circuit 33 may be contained within a housing 54 having a transparent window 55 in front of the port of the parabolic reflector 16. This housing 54 may be cooled, for example water cooled, in order to protect the entire laser gauge from heat or other hostile environments.

A particular application of the laser gauge is the measuring of hot steel forged bars as the workpiece 20 and while they are being formed. Forging hammers 56, FIG. 4, may be used to shape the workpiece 20, and a hammer solenoid 57, FIG. 1, used to provide a read enable signal to measure the workpiece dimension at each forging hammer blow. The laser gauge 11 measures and computes the "hot" diameter. Data is stored in the microprocessor as to the temperature coefficient of expansion of the particular material, e.g. steel, of the workpiece 20. Such temperature coefficient of expansion might be 0.00000622, for example. The pyrometer 39 measures the actual temperature of the workpiece 20 and therefore the microprocessor would be able to calculate the "cold" dimension of the workpiece 20 from the hot dimension; the temperature coefficient of expansion and the temperature. The cooled environment of the laser gauge 11 within the housing 54 assures the accuracy of the measurements by keeping the parabolic reflector 16 at a uniform cool temperature.

A wide variety of static measurements can be made with the laser gauge 11. These include round diameters, squares or rectangles, hole sizes, tapers and stepped shapes. The orientation of the piece under measurement is not critical since all distance measurements are made in two steps related to the axis 17 of the parabolic reflector, not related to the axis 21 of the workpiece 20.

Dynamic measurements are a particular feature of the present invention. The high speed measurement capability of the laser gauge 11 permits measurement of the dimension of the workpiece in dynamic motion. If the workpiece 20 is vibrating, the laser gauge 11 can measure its deviation from the parabolic reflector axis 17. These measurements can be stored in the memory of the microprocessor 36 and displayed as a graph or a printout that shows the displacement of the piece as it vibrates.

As stated above it is not essential that the parabolic reflector axis 17 intersect the workpiece axis 21. This permits the accurate non-contact gauging of a workpiece without accurate alignment of the gauge relative to the workpiece. However, if the axis 17 is carefully aligned with the workpiece axis 21, then the fact that a reference beam 44 is used permits another feature of the invention. This intersection of axes 17 and 21 means that the ovality or deviation from roundness of the workpiece 20 can be measured by the laser gauge 11. Any difference in the two partial dimensions $d_1$ and $d_2$ of FIG. 2 exceeding a predetermined limit can be computed and indicated on the readout panel 37.

The laser gauge 11 may also be used to measure the dimensions of square or rectangular pieces while they are being forged, as an example. A pair of laser gauges 11 and 11A are shown in FIG. 4 mounted by a structural member 60 so that each gauge is directed at a 45 degree angle to the vertical. The chucks for the flat bar forged workpiece 61 are oriented at a 45 degree angle and this establishes the laser gauges 11 and 11A to have laser beams oriented parallel to the two pairs of sides of the bar 61. The gauge 11 will measure the width of the bar 61 with the laser beam being reflected by the retroreflective tape 28. The laser gauge 11A will measure the thickness dimension of the bar 61 with the laser beam reflected by the retroreflective tape 28A. The principle of measurement is the same as that for round workpieces explained in FIGS. 1–3. Each side of the bar workpiece 61 being forged by hammers 56 or otherwise worked on will be measured independently of the other, with accuracy and speed and despite vibration and longitudinal movement of the bar.

The laser gauge 11 may also be used to measure straightness of an elongated bar workpiece 70 as shown in FIGS. 5 and 6. The laser gauge 11 is mounted on a turn table 71 which is rotatable about a vertical axis 72. The turntable 71 may be rotated about the axis 72 to scan the bar 70, which may be a forged bar, for example, to measure the straightness of this bar. The principle that is applied in measuring straightness is the fact that the laser gauge 11 measures the diameter of a round bar by rapidly measuring the two partial diameters $d_1$ and $d_2$. In other words, the gauge measures the y-axis of the upper and lower surfaces of the bar 70.

The straightness of the bar workpiece 70 may be measured by placing the two ends of the bar in a plane normal to the axis 72 of the turntable 71. Then when the sweep of the length of the bar is conducted, if the two partial dimensions $d_1$ and $d_2$ vary, this indicates a change in straightness, see FIG. 6.

FIG. 5 shows the laser gauge 11 as being aimed along a sweep reference line 73 having a 0 degree reference angle. When the laser gauge 11 is swung clockwise a first limit line 74 may be established and when it is swung counter clockwise a second limit line 75 may be established for the sweep of this laser gauge 11. A retroreflector 76 is positioned behind the workpiece 70 to reflect the laser beam as it is scanned up and down and swept from side to side. The first and second limit lines 74 and 75 will sense the ends of the bar workpiece 70 and establish a clockwise angle $-\alpha$, and a counter clockwise angle $+\alpha_2$ for the ends of the bar relative to the sweep reference line 73. The horizontal distance 77 between the laser gauge 11 and the workpiece 70 will be known. From this distance 77 and the two angles $-\alpha_1$ and $+\alpha_2$ the length of the bar workpiece 70 may be calculated by the microprocessor 36.

FIG. 6 shows the bar workpiece 70 as being curved downwardly in some intermediate portion thereof. A line 78 is a representation of a horizontal plane through which the parabolic reflector axis 17 sweeps from side to side. This horizontal reference plane is nominally at the center line of the bar workpiece 70 by the two ends of the workpiece being in a plane normal to the axis 72. The turntable 71 is pivoted to pivot the laser gauge 11 through angles $\alpha_2$ and $\alpha_2$ in increments, for example, by a stepper motor. This provides different scans at different horizontal locations along the bar 70 as indicated in FIG. 6. Dimensions $d_{1,1}$ will be a first partial diameter and $d_{2,1}$ is the second partial diameter. After the turntable 71 has been incremented a small amount, e.g. 1 degree or 5 degrees, a second scan will be made to establish the two partial dimensions $d_{1,2}$ and $d_{2,2}$. This will progress along the length of the bar as it is swept by the gauge 11.

The curvature of the bar workpiece 70 may be calculated from these various partial diameters. Considering first only the upper surface of the bar 70, one will be able to establish a first difference $$\Delta_1 = d_{1,2} - d_{1,1}.$$

$$\Delta_2 = d_{1,3} - d_{1,2}.$$

A second difference will now yield $$\Delta^2 = \Delta_2 - \Delta_1 = (d_{1,3} - d_{1,2}) - (d_{1,2} - d_{1,1})$$
$$= d_{1,3} - 2d_{1,2} - d_{1,1} \quad (4)$$

The curvature of the bar is proportional to this second difference of equation 4.

For the curvatures shown in FIG. 6 $\Delta_{1,1}{}^2$ and $\Delta_{1,2}{}^2$ have the same sign; namely, negative. $\Delta$hd $2,1^2$ and $\Delta_{2,2}{}^2$ have the same sign; namely, positive. $\Delta_{1,1}{}^2$ and $\Delta_{2,1}{}^2$ have opposite signs. From the above it may be determined whether the upper and lower curves are concavo-convex, as shown, both concave, both convex or convexo-concave.

The end of the bar may be marked with a reference line 80 and then the bar rotated on its axis through an angle $\beta$ to a new position and the process repeated by sweeping the length of the bar and scanning vertically the transverse dimension of the bar to again establish a new set of data pertaining to the curvature of the bar. This may be repeated through different rotational angles $\beta$ until all of the bar has been swept and scanned for various angles. The microprocessor 36 will store the data relating to $\alpha,\beta$ and the segments of the diameter $d_1$ and $d_2$. It will compare each computed distance with a stored error value. If the workpiece 70 measurements $d_1$ and $d_2$ are within tolerance, computations will continue. If the workpiece measurements are out of tolerance, the location of $\alpha$, the amount of error and the distance along the length of the bar where the error occurred will be stored in memory. A signal will actuate a solenoid or direct a marker to the proper location and mark the location of the error directly on the bar workpiece 70. The data stored in memory may be used to provide a printout of the deviations or may be supplied to a straightening machine as a feedback control to control the straightening machine to shape the bar workpiece 70.

In those cases where it is difficult to accurately position the two ends of the bar workpiece to be in a plane normal to the axis 72, a different reference means may be employed. A black bar 83 may be mounted in any suitable manner in the sweep space of the laser gauge 11, for example, it may be hung on the retroreflector 76 near the top or near the bottom, out of the way of the shadow of the bar workpiece, yet still within the scan from the parabolic reflector 16. The two end point measurements of the bar workpiece 70 may be determined and then a straight reference surface 84 at an edge of the black bar 83 positioned a given distance A above these two end point measurements. The black bar reference surface 84 thus becomes part of the reference means 44. It is then no longer critical that the two bar ends be in a plane normal to the axis 72.

As the turntable 71 is gradually indexed to sweep along the length of the bar 70 and the beam is scanned in a vertical direction by the scannable means 15, first and second y-axis measurements will be established from this new reference means 84. The first y-axis measurement $y_1$ will be from the reference line 84 to the top surface of the bar workpiece 70. The second y-axis measurement $y_2$ will be from the reference line 84 to the lower surface of the bar workpiece 70. The microprocessor 36 may then be used to compute the diameter at various places along the length of bar workpiece 70 by subtracting the first y-axis measurement from the second. The straightness of the bar will be determined by the changes in the first y-axis measurement $y_1$ or by changes in the second y-axis measurement $y_2$. If the changes are small and within tolerance, the bar passes inspection.

The above description of the laser gauge 11 shows that it is a self-contained unit wherein the gauge, the optics and the electrical circuit may all be mounted on one side of the workpiece for remote non-contact measurement of this bar. The accuracy of the unit permits the gauge 11 to be mounted at a considerable distance from the workpiece so as to protect the laser gauge 11 from damage and also so as to not interfere with any manufacturing operations which may be occurring on the workpiece, for example, hot forging or other shaping of this workpiece. The dynamic measurement characteristics permit the workpiece to be measured while it is vibrating or otherwise rapidly moving. The only part of the system which is exposed to the hot or otherwise hostile environment is the retroreflective tape 28 or 76 and since this is composed of small glass beads it is highly resistant to such hostile environments. Also the surface on which this tape is mounted need not be perfectly flat since the characteristics of this tape permit reflection over a wide angle of incidence. The high speed of measurement permits the laser gauge 11 to store measured data and compare the data to a preset standard of measurement that is stored in the microprocessor 36. The use of the reference beam 44 permits much greater flexibility of the gauge 11 permitting measurements of ovality or eccentricity, features not found on the prior art gauges.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the circuit and the combination and arrangement of parts and circuit elements may be resorted to without departing from the spirit and scope of the invention as hereinafter claimed.

What is claimed is:

1. A laser gauge for non-contact measuring of a dimension of a workpiece comprising, in combination,
    a laser mounted to project a laser beam,
    a parabolic mirror having a focal point along the axis of the mirror,
    scannable means substantially at said focal point mounted to scan said laser beam along said parabolic mirror and establishing first and second laser beam paths extending from said parabolic mirror parallel to said axis and immediately adjacent first and second opposite sides of the workpiece, respectively,
    photodetector means mounted to receive the laser light beam from both said first and second laser beam paths,
    output means connected to receive the output of said photodetector means,
    means actuated in accordance with said scannable means to determine the position thereof and having an output to said output means, whereby a first signal is received at said output means when said scannable means is positioned at a first position to establish the laser beam in said first beam path, and a second signal is received at said output means when said scannable means is positioned at a second position to establish the laser beam in said second path,
    means establishing a reference line relative to said first and second beam paths,
    said output means including means to determine first and second partial dimensions of any said workpiece relative to said reference line, which partial dimensions are perpendicular to said axis,
    and the total dimension of the workpiece being algebraically related to said first and second partial dimensions.

2. A laser gauge as set forth in claim 1, wherein the total dimension of the workpiece is the sum of said first and second partial dimensions.

3. A laser gauge as set forth in claim 1, wherein said means establishing said reference line includes means establishing a reference signal from the output of said photodetector means.

4. A laser gauge as set forth in claim 4, wherein said means establishing said reference line includes means establishing the laser beam in a plane containing the axis of said parabolic mirror.

5. A laser gauge as set forth in claim 3, wherein said means establishing said reference line includes a beam splitter mounted in the path of the laser light beam.

6. A laser gauge as set forth in claim 1, wherein said means establishing said reference line includes means to pass the laser light beam to said photodetector means by way of said scannable means.

7. A laser gauge as set forth in claim 1, wherein said reference line is established substantially along the axis of said parabolic mirror,
    means establishing said axis substantially intersecting an axis of a workpiece whereby the workpiece dimension is measured in said first and second partial dimensions to determine the eccentricity of the workpiece by variations between said partial dimensions.

8. A laser gauge as set forth in claim 1, including rate sensor means connected to said scannable means to sense the speed of scanning thereof and having an output to said output means.

9. A laser gauge as set forth in claim 1, wherein said output means includes a microprocessor connected to sum said first and second partial dimensions as established by said first and second beam paths and said reference line.

10. A laser gauge as set forth in claim 9, including a pyrometer mounted to read the temperature of any hot workpiece and having an output to said microprocessor,
    said microprocessor connected to calculate the cold dimension of the workpiece in accordance with the measured dimension of a hot workpiece and the temperature thereof as determined by said pyrometer.

11. A laser gauge as set fort in claim 1, wherein said scannable means includes a rotatable mirror,
    motor means connected to rotate said rotatable mirror,
    said means establishing said reference line establishes a reference beam with said rotatable mirror substantially perpendicular to a plane containing said axis,
    and said output means establishing said first partial dimension of the workpiece in accordance with said reference beam and said first position and determining said second partial dimension of the workpiece in accordance with said reference beam and said second position.

12. A laser gauge as set forth in claim 1, including means to sweep said parabolic mirror about a second axis substantially perpendicular to said mirror axis to sweep a second dimension of a workpiece,
and said output means connected to determine said first mentioned dimension of any said workpiece at different sweep positions of said parabolic mirror.

* * * * *

UNITED STATES PATENT AND TRADEMARK OFFICE
CERTIFICATE OF CORRECTION

PATENT NO. : 4,201,476
DATED : May 6, 1980
INVENTOR(S) : Dominick J. Musto and Harold Lerner It is certified that error appears in the above—identified patent and that said Letters Patent is hereby corrected as shown below:

Column 8, lines 7, 8, 9 and 10 the mathematical calculations are incorrectly shown. They should read as follows:

--Fig. 6 $\Delta^2_{1,1}$ and $\Delta^2_{1,2}$ have the same sign; namely, negative. $\Delta^2_{2,1}$ and $\Delta^2_{2,2}$ have the same sign; namely, positive. $\Delta^2_{1,1}$ and $\Delta^2_{2,1}$ have opposite signs.---

Signed and Sealed this

Twelfth Day of August 1980

[SEAL]

Attest:

SIDNEY A. DIAMOND

Attesting Officer

Commissioner of Patents and Trademarks